US012122876B2

(12) United States Patent
Ju et al.

(10) Patent No.: US 12,122,876 B2
(45) Date of Patent: Oct. 22, 2024

(54) METHOD FOR PREPARING REACTIVE SEALANT RESIN

(71) Applicants: WANHUA CHEMICAL GROUP CO., LTD., Yantai (CN); WANHUA CHEMICAL (NINGBO) CO., LTD., Ningbo (CN)

(72) Inventors: Changxun Ju, Yantai (CN); Bin Liu, Yantai (CN); Mingyong Wang, Yantai (CN); Tian Ye, Yantai (CN); Zhengyang Shi, Yantai (CN); Yuan Li, Yantai (CN); Weiqi Hua, Yantai (CN)

(73) Assignees: WANHUA CHEMICAL GROUP CO., LTD., Yantai (CN); WANHUA CHEMICAL (NINGBO) CO., LTD., Ningbo (CN)

( * ) Notice: Subject to any disclaimer, the term of this patent is extended or adjusted under 35 U.S.C. 154(b) by 664 days.

(21) Appl. No.: 17/413,858

(22) PCT Filed: Dec. 27, 2018

(86) PCT No.: PCT/CN2018/124350
§ 371 (c)(1),
(2) Date: Jun. 14, 2021

(87) PCT Pub. No.: WO2020/133062
PCT Pub. Date: Jul. 2, 2020

(65) Prior Publication Data
US 2022/0056209 A1 Feb. 24, 2022

(51) Int. Cl.
*C08G 65/336* (2006.01)
*B01J 23/42* (2006.01)
*C08G 65/26* (2006.01)
*C08L 75/04* (2006.01)
*C09D 171/02* (2006.01)
*C09J 171/02* (2006.01)
*B01J 31/16* (2006.01)
*C08G 101/00* (2006.01)

(52) U.S. Cl.
CPC ............ *C08G 65/336* (2013.01); *B01J 23/42* (2013.01); *C08G 65/2609* (2013.01); *C08L 75/04* (2013.01); *C09D 171/02* (2013.01); *C09J 171/02* (2013.01); *B01J 31/1658* (2013.01); *B01J 2231/323* (2013.01); *C08G 2101/00* (2013.01); *C08G 2170/00* (2013.01); *C08G 2190/00* (2013.01)

(58) Field of Classification Search
CPC .......................... C08G 65/336; C08G 65/2696
USPC ....................................................... 528/499
See application file for complete search history.

(56) References Cited

U.S. PATENT DOCUMENTS

| 3,971,751 A * | 7/1976 | Isayama ............. C08G 65/2606 |
| | | 524/849 |
| 5,223,583 A | 6/1993 | Higuchi et al. |
| 2014/0288222 A1 | 9/2014 | Yano et al. |
| 2020/0048427 A1* | 2/2020 | Phan ........................ C08K 5/06 |

FOREIGN PATENT DOCUMENTS

| CN | 1111255 A | 11/1995 |
| CN | 101921393 A | 12/2010 |
| CN | 102712814 A | 10/2012 |
| CN | 104350084 A | 2/2015 |
| CN | 106833481 A | 6/2017 |
| CN | 108102089 A | 6/2018 |
| CN | 109071798 A | 12/2018 |
| CN | 110614122 A | 12/2019 |
| CN | 111378107 A | 7/2020 |
| EP | 2093244 A1 | 8/2009 |
| EP | 2177571 A1 | 4/2010 |
| EP | 3165572 A1 | 5/2017 |
| JP | H07179744 A | 7/1995 |
| JP | 2008050510 A | 3/2008 |
| JP | 2012031412 A | 2/2012 |
| JP | 2017155225 A | 9/2017 |
| JP | 2018197287 A | 12/2018 |
| WO | WO-2010011750 A1 * | 1/2010 ......... C08G 65/2621 |

OTHER PUBLICATIONS

Machine translation of CN 110614122 A into English (no date).*
Chinese Office Action, for CN Application No. 2018116114890, 16 pages, dated Dec. 23, 2021.
Drake, R, et al., "Remarkable activity, selectivity and stability of polymer-supported Pt catalysts in room temperature, solvent-less, alkene hydrosilylations", Chem Commun, DOI: 10.1039/b005912i, 1931-1932 (2000).
European Search Report, for EP Application No. 18945060.4, 72 pages, dated Jul. 1, 2022.
Japanese Office Action, for JP Application No. 2021-530157, 6 pages, dated Apr. 14, 2022.
PCT International Search Report for PCT/CN2018/124350, 4 pages, dated Aug. 29, 2019.

* cited by examiner

*Primary Examiner* — Marc S Zimmer
(74) *Attorney, Agent, or Firm* — Viksnins Harris Padys Malen LLP

(57) ABSTRACT

Disclosed by the present invention is a method for preparing a reactive sealant resin, the method comprising: (1) under the action of an alkali catalyst, polymerizing a hydroxyl-containing initiator with an epoxy compound to obtain a polyether polyol; (2) adding an alkoxide reagent and a halogenated end-capping agent containing a double bond to the polyether polyol obtained in step (1) for reaction, so as to obtain a crude double-bonded polyether product, and refining the crude product to obtain a modified polyether product; and (3) subjecting the modified polyether and hydrogen-containing silane to silane end-capping reaction under the action of a hydrosilylation catalyst, so as to obtain the target product, i.e., a reactive sealant resin. The resin has excellent properties as well as good adhesion and paintability.

22 Claims, No Drawings

METHOD FOR PREPARING REACTIVE SEALANT RESIN

TECHNICAL FIELD

The present disclosure relates to the technical field of sealants and, in particular, to a method for preparing a reactive sealant resin, which is mainly used for preparing an elastic sealant.

BACKGROUND

Since the 1980s, with the modernization of urban construction and the emergence of higher requirements for building functions, the variety and quantity of high-performance sealants for sealing seams of building structures in China have been increasing. The first used in construction is polysulfide sealants, followed by acrylic sealants, silicone sealants and polyurethane sealants, and the development of sealants is rapid. Among the above-mentioned sealants, the silicone sealants are in the fastest development, have advantages of fast curing speed, high temperature resistance and excellent weather resistance, but also have disadvantages such as low strength and surface unpaintability. The polyurethane sealants have advantages of high strength, good oil and solvent resistance and good abrasion resistance, but have disadvantages of ease for foaming in the curing process, poor weather resistance and dependence on primers for adhesion. The development of the market has put forward the demand for sealants with comprehensive functions and better economy to effectively improve and enhance the adaptability and reliability of sealants.

The curing mechanism of reactive sealants is that an alkoxy-terminated group reacts with water in the air under the action of a catalyst to remove small molecular alcohol and the main chain is crosslinked to form a three-dimensional network structure, and thus the reactive sealants gain advantages of both silicone and polyurethane. In recent years, this type of reactive sealant has received more and more attention and has been widely applied in Europe and the United States. Because of its wide range of adhesion and adaptability to substrates, such a reactive sealant is used in various fields such as construction, automotive, rail transportation, container, equipment manufacturing and industry, which also indicates its broad application prospect.

The base polymer of end-capping reactive sealants is a siloxane-terminated polyether, which can be achieved mainly by the following methods.

1. The polyurethane sealant is terminated and modified. Specifically, a NCO-terminated polyether prepolymer reacts with allyl alcohol to synthesize a modified polyether, and the modified polyether and an organosilicon compound (such as methyldimethoxysilane) are subjected to a hydrosilylation reaction under the catalysis of chloroplatinic acid to prepare a siloxane-terminated polyether. However, since the molecular weight of the polyether used is low, the main chain of the prepared organic silicone-modified polyether contains a number of carbamate groups that can easily form hydrogen bonds, and thus the viscosity of the polymer is high. In addition, since the amount of fillers added during the preparation of sealants is relatively reduced, the mixing operation is also more difficult.

2. A high-molecular-weight polyether having a double bond at one end and a hydroxyl group at the other end is synthesized, then the high-molecular-weight polyether is multiplied into a modified polyether having a larger molecular weight by using a coupling agent (such as diisocyanate), and the modified polyether is prepared into a siloxane-terminated polyether through an end-capping process. In this method, since the polyether used has a high molecular weight and thus contains few carbamate groups on the molecular chain, the polyether can be subjected to the coupling reaction once by using the coupling agent, which has little effect on the viscosity of the polymer, there is also no by-product of the coupling reaction, and the process is simple to operate. However, the coupling agent remains in the product, and the weather resistance is poor.

3. A hydroxyl-terminated polyether having a low molecular weight reacts with an alkali metal or an alkali metal hydroxide by Williamson ether synthesis, the molecular weight of the hydroxyl-terminated polyether is multiplied by a dichloromethane coupling method, then the hydroxyl-terminated polyether reacts with allyl chloride to form a double-bond-terminated polyether, and finally a siloxane-terminated polyether is prepared through a hydrosilylation reaction. However, the molecular weight distribution of the product obtained through chain extension using dichloromethane is wide, which directly affects the performance of the sealant, and this method can only be used for preparing a difunctional resin.

4. A high-molecular-weight hydroxyl-terminated polyether is synthesized by using a bimetallic catalyst, then the polyether is modified, and a siloxane-terminated polyether is prepared through hydrosilylation. However, in this method, the removal of a by-product salt in the process is a difficulty, and there is no reasonable solution at present.

SUMMARY

In view of deficiencies in the existing art, the object of the present disclosure is to provide a method for preparing a reactive sealant resin to better prepare a reactive sealant resin.

To achieve the object of the present disclosure, the present disclosure adopts the following technical solution.

A method for preparing a reactive sealant resin is provided. The method includes the steps described below.

(1) Preparation of a polyether polyol: under the action of an alkali catalyst, a hydroxyl-containing initiator is polymerized with an epoxide to obtain a first polyether polyol.

(2) Polyether modification: an alkoxidation reagent and a halogenated end-capping agent containing a double bond are added to the first polyether polyol obtained in step (1) for reaction to obtain a crude product of double-bond-terminated polyether, and the obtained crude product is refined to obtain a product of modified polyether; wherein during refining, the crude product is first neutralized by using a neutralizing agent, then water and an organic solvent are added, and a separation is carried out by using a coalescing separator, after the organic solvent is removed, the product of modified polyether is obtained.

(3) Silane end-capping: the modified polyether obtained in step (2) as a raw material and hydrogen-containing silane are subjected to a silane end-capping reaction under the action of a hydrosilylation catalyst to obtain a target product of a reactive sealant resin.

Preparation of a Polyether Polyol

In step (1) of the present disclosure, the hydroxyl-containing initiator, the alkali catalyst and the epoxy compound (also referred to as a polymerized monomer) used for preparing the first polyether polyol are all commonly used raw materials known in the art for preparing the polyether polyol. In step (1), the hydroxyl-containing initiator may be a small-molecule monohydric alcohol or a small-molecule polyol having a molecular weight of not greater than 400, and, for example, may be one or more of methanol, ethanol, ethylene glycol, 1,2-propylene glycol, 1,3-propylene glycol, glycerol, trimethylolpropane, pentaerythritol, sorbitol, mannitol, sucrose, glucose or xylitol, preferably 1,2-propylene glycol and/or glycerol.

The alkali catalyst may be one or more of an alkali metal, an alkali metal hydride, an alkali metal hydroxide, an alkali metal alkoxide, a composite metal cyanide or a phosphazene catalyst, preferably a composite metal cyanide such as zinc hexacyanocobaltate. In the reaction system of step (1), the content of the alkali catalyst may be 10 ppm to 100 ppm, preferably 20 ppm to 80 ppm, more preferably 30 ppm to 60 ppm.

The epoxy compound may be one or more of ethylene oxide, propylene oxide, epoxy isobutane or tetrahydrofuran, preferably ethylene oxide and/or propylene oxide, more preferably propylene oxide or a mixture of ethylene oxide and propylene oxide in which the content of the ethylene oxide is not more than 15 wt %.

In an embodiment, in step (1), the reaction temperature for preparing the polyether polyol is 90° C. to 180° C., preferably 100° C. to 160° C.; the reaction pressure is 0.05 MPa to 0.8 MPa, for example, 0.1 MPa, 0.3 MPa or 0.5 MPa, preferably 0.2 MPa to 0.6 MPa.

According to the method of the present disclosure, preferably, the first polyether polyol has a molecular weight of 3000 g/mol to 50000 g/mol and a functionality of 2 to 8; further preferably, the first polyether polyol has a molecular weight of 8000 g/mol to 35000 g/mol and a functionality of 2 to 6.

The preparation of the polyether polyol is well known in the art. In the present disclosure, preferably, in step (1), the first polyether polyol is obtained by a n-stage polymerization, wherein n≥2, for example, 4, 6, 8 or 10. In the present disclosure, "by a n-stage polymerization" means that after the polymerization of the previous stage is completed, a certain amount of epoxide is added to continue the polymerization of a new stage, and so on until the polymerization of n stages is completed. It is to be understood by those skilled in the art that the larger the target molecular weight of the final polyether, the larger n may be set. For example, when the target molecular weight of the final polyether is not less than 18000 g/mol, preferably n≥5. It has been found that compared with one-step polymerization, the staged polymerization can effectively reduce the molecular weight difference between the polyether polyol molecules in the target product, resulting in a polyether polyol having a narrow molecular weight distribution. The target molecular weights of each polymerization stage are sequentially set to M1, . . . , Mi, . . . , and Mn. At this point, the polymerization route can be expressed as hydroxyl-containing initiator-M1- . . . -Mn, wherein Mn is the target molecular weight of the final product of polyether polyol. For example, when n=5, the polymerization route can be expressed as hydroxyl-containing initiator-M1-M2-M3-M4-M5. Preferably, M1≤1000 g/mol, and Mi−M(i−1)≤12000 g/mol, for example, 2000 g/mol, 4000 g/mol, 6000 g/mol, 8000 g/mol or 10000 g/mol, that is, the target molecular weights of the adjacent stages are not suitably set with an excessively large difference so that the molecular weight distribution of the final product of polyether polyol can be reduced, wherein i is an integer between 1 and n, for example, when n=2, i is 1 or 2 and when n=3, i is 1, 2 or 3, and M0 represents the molecular weight of the initiator. Further preferably, when Mi≤10000 g/mol, for example, 2000 g/mol, 4000 g/mol, 6000 g/mol or 8000 g/mol, Mi−M(i−1)≤5000 g/mol, for example, 2000 g/mol, 3000 g/mol or 4000 g/mol, that is, when the target molecular weight is not greater than 10000 g/mol, the target molecular weight at the previous stage should not be suitably set so as to differ from this target molecular weight by more than 5000 g/mol, which facilitates the reduction of the molecular weight distribution of the final product of polyether polyol.

For example, the synthesis of the polyether polyol is carried out by a staged polymerization process by using a small-molecule polyol as an initiator to prepare a product of polyether polyol having narrow molecular weight distribution, low viscosity and high molecular weight. The polymerization route is as follows: a difunctional alcohol-400 g/mol-2000 g/mol-8000 g/mol-12000 g/mol-18000 g/mol-24000 g/mol; or a trifunctional alcohol-800 g/mol-3000 g/mol-12000 g/mol-18000 g/mol-24000 g/mol-30000 g/mol; or a tetra- or penta- or hexa-functional alcohol-800 g/mol-4000 g/mol-8000 g/mol-12000 g/mol-18000 g/mol-24000 g/mol-30000 g/mol-40000 g/mol.

In the present disclosure, in order to obtain a narrow-distribution and low-viscosity product, a staged polymerization process is used, and the molecular weight of the intermediate is controlled by controlling the addition amount of raw materials to achieve the above-mentioned polymerization route. Specifically, when the average molecular weight of the epoxy compound added at each stage is X and the molecular weight of the hydroxyl-containing initiator is Y (when the hydroxyl-containing initiator is a mixture, the molecular weight is calculated as an average molecular weight), the molar amount of the epoxy compound to be added at the $i^{th}$ stage is Z times the molar amount of the initiator, which satisfies the following relationship: Z=(Mi−M (i−1))/X, wherein i is an integer between 1 to n, and when i=1, M0 is Y.

Modification of a Polyether Polyol

In the present disclosure, the polyether polyol is modified by Williamson reaction to obtain a crude product of double-bond-terminated polyether. The alkoxidation reagent used in the above-mentioned modification treatment may be a mixture of one or more of an alkali metal, an alkali metal hydride, an alkali metal hydroxide or an alkali metal alkoxide, preferably one or more of an alkali metal sodium, sodium hydride or sodium methoxide. The polyether modified compound used is a halide containing a double bond, preferably allyl chloride or methallyl chloride.

In an embodiment, the molar ratio of the amount of the alkoxidation reagent to the hydroxyl equivalent of the polyether polyol (that is, the total molar amount of hydroxyl groups in the polyether polyol) is 1:1 to 3:1, preferably 1.2:1 to 2.4:1, for example, 1.5:1 or 2:1; the molar ratio of the amount of the halide containing a double bond to the hydroxyl equivalent of the polyether polyol is 1:1 to 3:1, preferably 1.2:1 to 2.4:1, for example, 1.5:1 or 2:1.

In an embodiment, the reaction temperature for modifying the polyether polyol to prepare the double-bond-terminated polyether is 80° C. to 160° C., preferably 100° C. to 140° C., for example, 120° C. or 130° C.; the reaction time is 3 hours to 18 hours, preferably 5 hours to 15 hours, for example, 8 hours, 10 hours or 12 hours.

The crude product of double-bond-terminated polyether obtained by modification needs to be further refined to remove impurities. During refining, the crude product is first neutralized by using a neutralizing agent, for example, to a pH of 4 to 8, then water and an organic solvent are added, water (and dissolved salt) is separated by using a coalescing separator, and the organic solvent is further removed, for example, by distillation under reduced pressure using a usable device such as a thin-film evaporator, and finally, the product of modified polyether is obtained. The neutralizing agent used may be one or more of hydrochloric acid, sulfuric acid, phosphoric acid, acetic acid or lactic acid, preferably acetic acid or lactic acid, and the amount of the neutralizing agent may be 0.1 wt % to 5 wt % of the amount of the crude product of polyether, preferably 0.5 wt % to 3 wt %, for example, 1 wt % or 2 wt %. The organic solvent is an alkane, a benzene compound or a nitrile compound, preferably n-hexane. The mass ratio of the organic solvent, water and crude product is (0.1 to 3) (for example, 1 or 2):(0.1 to 2) (for example, 0.5, 0.8 or 1.5):1, preferably (0.5 to 1.5):(0.3 to 1):1.

Silane End-Capping

In the present disclosure, the above-mentioned modified polyether and hydrogen-containing silane are subjected to a silane end-capping reaction under the action of a hydrosilylation catalyst (for example, Karstedt catalyst), and the end-capping reaction is commonly used for the preparation of reactive sealant resins. The hydrogen-containing silane may be one or more of trimethoxysilane, triethoxysilane, methyldimethoxysilane or methyldiethoxysilane, preferably methyldimethoxysilane and/or trimethoxysilane. In an embodiment, the molar ratio of the amount of the hydrogen-containing silane to the double bond equivalent of the modified polyether (that is, the total molar amount of double bond s in the modified polyether) is 0.9:1 to 2:1, for example, 1.2:1 or 1.8:1, preferably 1:1 to 1.5:1; the reaction temperature is 50° C. to 140° C., for example, 80° C. or 100° C., preferably 60° C. to 120° C.; the reaction time is 1 hour to 8 hours, preferably 2 hours to 6 hours, for example, 4 hours.

In an embodiment, the hydrosilylation catalyst is a supported metal platinum catalyst for catalyzing the hydrosilylation reaction, whose amount in the reaction system in step (3), based on the platinum content, is 0.1 ppm to 50 ppm, preferably 1 ppm to 30 ppm, for example, 5 ppm, 10 ppm or 20 ppm.

Supported Metal Platinum Catalyst

In an embodiment, the supported metal platinum catalyst is obtained by subjecting a chloroplatinic acid solution to impregnation, reduction and drying with a polyurethane flexible foam as a carrier. The polyurethane flexible foam is prepared by subjecting a raw material including a second polyether polyol to a foaming reaction, wherein a polymerized monomer for preparing the second polyether polyol includes an epoxide containing a C=C double bond in the molecule, and the content of the epoxide in the polymerized monomer is 1 wt % to 40 wt %, preferably 10 wt % to 30 wt %, for example, 20 wt %. Preferably, the epoxide containing a C=C double bond is one or more of allyl glycidyl ether

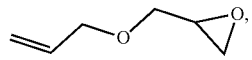

methallyl glycidyl ether, glycidyl acrylate or glycidyl methacrylate

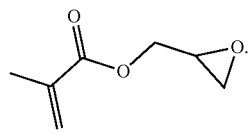

In an embodiment, the second polyether polyol is obtained by polymerizing the hydroxyl-containing initiator with the polymerized monomer including the epoxide containing a C=C double bond in the molecule under the action of an alkali catalyst. Preferably, the polymerized monomer consists of at least one of ethylene oxide or propylene oxide and the epoxide containing a C=C double bond in the molecule. Further preferably, during the addition of the polymerized monomer, the polymerized monomer last added does not contain the epoxide containing a C=C double bond in the molecule, for example, the epoxide containing a C=C double bond in the molecule is first added. The hydroxyl-containing initiator, the alkali catalyst, and the reaction conditions may be the same as those as described above. Preferably, the second polyether polyol has a molecular weight of 700 g/mol to 10000 g/mol, for example, 1000 g/mol, 3000 g/mol, 5000 g/mol or 8000 g/mol, and a nominal functionality of 1 to 6, preferably 2 to 6, for example, 3 or 5. The prepared second polyether polyol may be further refined to remove impurities. For example, the crude product of the prepared second polyether polyol (crude polyether) is neutralized, added with water, an adsorbent and a filter aid, and then filtered to obtain the refined second polyether polyol. In an embodiment, the neutralizing agent may be an aqueous solution of phosphoric acid, in which the amount of phosphoric acid is 0.1% to 1% of the total mass of the crude polyether and the amount of water is 1% to 10% of the total mass of the crude polyether. The adsorbent is magnesium silicate whose amount is 0.1% to 8% of the total mass of the crude polyether. The filter aid is diatomite whose amount is 0.01% to 1% of the total mass of the crude polyether.

The formulation and preparation method of the polyurethane flexible foam are well known to those skilled in the art, for which, for example, reference is made to the formulation and preparation method of the polyurethane flexible foam disclosed in the related documents such as CN102408538A. In the embodiment, the polyurethane flexible foam may be obtained by foaming raw materials in the following weight parts.

Second polyether polyol: 100 parts (parts by weight, the same below)
Water: 1 to 10 parts
Physical foaming agent: 0.01 to 50 parts
Silicone oil: 0 to 5 parts
Crosslinking agent: 0 to 5 parts
Foaming catalyst: 0.01 to 1 parts
Gel catalyst: 0.01 to 1 parts
Antioxidant: 0 to 1 parts
Anti-yellowing agent: 0 to 1 parts
Isocyanate: 30 to 100 parts
Isocyanate index is 50 to 200.

The physical foaming agent is selected from one or more of 141b, dichloromethane or acetone.

The crosslinking agent is selected from one or more of diethanolamine, triethanolamine, glycerol or trimethylolpropane.

The foaming catalyst may be selected from tertiary amine catalysts, market brand No.: A1 or A33, including but not limited to the above-mentioned commercial catalysts. The gel catalyst may be selected from stannous octoate (T9) or stannous dilaurate (T12), including but not limited to the above-described commercial catalysts.

The antioxidant is selected from hindered phenolic products such as 1135, and the anti-yellowing agent is selected from phosphate products.

During the impregnation, the polyurethane flexible foam is added to the chloroplatinic acid solution, the impregnation is carried out at a reaction temperature of 10° C. to 80° C., for example, 20° C., 40° C. or 60° C., then a reducing agent is added and reacted for 10 hours to 30 hours, for example, 15 hours, 20 hours or 25 hours, and after the reaction, the polyurethane flexible foam is taken out, washed with a solvent and dried to obtain the supported metal platinum catalyst for further use. In the process of the above-mentioned reaction, there is no limitation on the pressure, for example, the reaction may be carried out under atmospheric pressure or slightly positive pressure (not more than 10% of atmospheric pressure). Preferably, the amount of substance of chloroplatinic acid in the impregnation solution is 0.01*n to 0.6*n (n is the amount of substance of double bonds contained in the added polyurethane flexible foam, calculated in terms of unsaturation).

The solvent used in the chloroplatinic acid solution may be one or more of toluene, xylene, methanol, ethanol or isopropanol, which is the same as the solvent used for washing. The reducing agent used may be one or more of the following: sodium bicarbonate, potassium bicarbonate, sodium carbonate or potassium carbonate, and the amount of the reducing agent used may be 100% to 1000% of the mass of chloroplatinic acid.

The pressures described in the present disclosure are all the absolute pressure, and the molecular weights, unless otherwise specified, are all the number-average molecular weight.

Compared with the existing art, the present disclosure has the beneficial effects described below.

1. The reactive sealant resin prepared according to the present disclosure is prepared by using a small-molecule polyol as the raw material, and the reactive sealant resin can be better prepared by processes of preparing, modifying and end-capping the polyether polyol, among which, especially, coalescence separation is used in the modification process, thereby avoiding the process difficulties such as filtration and solid waste treatment.

2. The reactive sealant resin prepared according to the present disclosure has the characteristics of narrow molecular distribution, low product viscosity and high termination rate of functional groups. Therefore, the reactive sealant resin prepared according to the present disclosure is convenient to use and excellent in performance, and can be directly used for the preparation of sealants. Such a reactive sealant resin is mainly used for the preparation of elastic sealants because of its excellent mechanical properties, weather resistance, stain resistance, good adhesion and paintability, low toxicity and environmental friendliness, and is widely used in various fields such as buildings, household appliances, and industries.

3. The supported metal platinum catalyst in the present disclosure is a Karstedt catalyst which is supported on a high-specific-surface-area polyurethane flexible foam. Since the vinyl bridge in the catalyst ligand is fixed onto the polyurethane foam through reaction, the zero-valent platinum catalyst chelated by the ligand can also be well supported and not easily shed and lost. Such a catalyst is a supported metal platinum catalyst that has advantages of high specific surface area, ease for recovery, high catalytic efficiency, low catalyst deactivation, and controllable catalyst appearance. The catalyst has high catalytic efficiency and thus is particularly suitable for being used in some additional reactions in which the catalysts have high solubility or are easily lost or deactivated, particularly the hydrosilylation reaction. In addition, such a catalyst is more suitable for industrial scale-up since the foam can be modularly customized.

DETAILED DESCRIPTION

The present disclosure will be further described in detail through the following examples, but the following examples shall not be construed as limitations to the scope of the present disclosure. Without departing from the above method ideas of the present disclosure, various substitutions or changes made in accordance with the general technical knowledge and conventional means of the art shall be included within the scope of the present disclosure.

In the following Examples and Comparative Examples, unless otherwise specified, the reagents used are analytical pure, and the contents thereof are mass content.

In the test methods involved in Examples and Comparative Examples, the hydroxyl number was determined in accordance with *Determination of hydroxyl number* in GB/T 12008.3-2009; the acid number was determined in accordance with *Determination of acidity as acid number* in GB/T 12008.5-2010; the degree of unsaturation was determined in accordance with *Determination of degree of unsaturation* in GB/T 12008.6-2010; the water content was determined in accordance with *Plastics—Polyols for use in the production of polyurethan—Determination of water content* in GB/T 22313-2008, and the specific surface area of the foam catalyst was determined in accordance with *Determination of the specific surface area of solids by gas adsorption using the BET method* in GB/T 19587-2004.

The foaming catalyst was A1 and A33 (purchased from Aladdin). The gel catalyst was selected from stannous octoate (T9) (purchased from Aladdin).

The antioxidant was selected from the hindered phenolic product 1135 (purchased from BASF). The anti-yellowing agent was selected from the phosphate anti-yellowing agent 168 (purchased from Dongguan Tongda Chemical).

The physical foaming agent was dichloromethane. The crosslinking agent was diethanolamine.

The model of the GPC instrument was Waters-2707-1515-2414, from Waters. The chromatographic column used was Agilent PL1113-6500 (300×7.5 mm). The analytical test method was as follows: 0.04 g of samples was added into a 4 ml sample bottle, diluted by adding tetrahydrofuran using a disposable dropper to a concentration of about 1%, filtered through a 0.45 um nylon membrane, and analyzed by GPC.

The model of the nuclear magnetic resonance chemical analyzer was AVANCEIII 400 MHz, from Bruker. The analytical test condition was as follows: 5 mm BBO probe, experimental type PROTON, pulse sequence zg30, the number of scans 64, and temperature 298 k.

Preparation of the Supported Metal Platinum Catalyst

Example 1

32 g of methanol (1 mol) was added to a 1 L kettle as an initiator, 0.7 g of catalyst sodium hydroxide was added, and nitrogen gas replacement was carried out.

6.68 g of allyl glycidyl ether was added and reacted for 1 hour with the temperature raised to 100° C. and the pressure raised to 0.05 MPa. 460.92 g of propylene oxide was then added and reacted until the pressure was no longer changed, and then 200.4 g of ethylene oxide was added and reacted for a total of 1 hour until the reaction pressure was no longer changed. The reaction product was cured for 1 hour to obtain a crude product of polyether. Phosphoric acid as a neutralizing agent, water, magnesium silicate as an adsorbent and diatomite as a filter aid, which were 0.1%, 1%, 0.1%, and 0.01% of the total mass of the crude polyether, respectively, were added to the crude product of polyether and then filtered to obtain a refined second polyether polyol.

Through a determination, the water content and the acid number of the product were qualified (water content <0.05% and acid number <0.1 mgKOH/g, the same below); the hydroxyl number was 80.1 mgKOH/g (theoretical hydroxyl number would be 80.14 mgKOH/g), which proves that the molecular weight of the product had reached the calculated molecular weight of 700; the determined degree of unsaturation was 0.08 mmol/g (theoretical degree of unsaturation would be 0.084 mmol/g).

The formulation of the polyurethane flexible foam was as follows:
Second polyether polyol: 100 parts (parts by weight, the same below)
Water: 3.3 parts
Physical foaming agent: 10 parts
Silicone oil: 0.5 parts
Crosslinking agent: 1 part
Foaming catalyst: 0.01 parts
Gel catalyst: 0.02 parts
Antioxidant: 0.3 parts
Anti-yellowing agent: 0.2 parts
Isocyanate (TDI): 47 parts
Isocyanate index: 100

In the above-mentioned formulation, the constituents except for isocyanate (TDI) were uniformly mixed in advance and cooled to room temperature, and then isocyanate was added at room temperature to the above mixture and stirred quickly. After that, the mixture was poured into a foaming mold and then de-molded after the foaming and aging in the foaming mold were completed to obtain a foam having a density of 40 kg/m$^3$, a white appearance and good air permeability. The degree of unsaturation of the product was determined to be 0.05 mmol/g.

100 g of the foam was cut into small pieces of 1 cm$^3$ and dispersed after adding chloroplatinic acid (0.05 mmol) and 10 g of toluene, and then 0.0205 g of sodium bicarbonate was added. The above materials reacted for 10 hours at 10° C. After the reaction, the foam was washed with 30 g of toluene and dried for 1 hour at 50° C. to prepare the final supported metal platinum catalyst. The specific surface area of the catalyst was 2300 m$^2$/g.

To verify the catalyst, 100 g of allyl polyether (with a molecular weight of 1000, a double bond functionality of 2, and a degree of unsaturation of 2 mmol/g) was added to a 3 L reaction flask and heated to 80° C. After the above supported metal platinum catalyst was added to the reactor, 2100 g of a hydrogen-containing silicone oil (with a molecular weight of 2000, a silicon hydrogen bond content of 0.1 mmol/g) (silicon hydrogen:double bond=1.05:1) was added to the reactor and reacted for 1 hour. After the reaction, the catalyst was taken out, cooled and discharged. The degree of unsaturation of the reaction solution was determined to be in a trace amount, indicating that the reaction efficiency was extremely high.

The above-mentioned silane end-capping reaction was repeated 100 times. After the completion of each reaction, the foam was washed with the same solvent as that used for preparing the catalyst to verify the cycle life test. It was found that the reaction yield did not change substantially (the difference between the reaction yields did not exceed ±0.5% of the average yield value).

Example 2

2.3 g of ethanol (0.05 mol) and 4.6 g of triglyceride (0.05 mol) were added to a 1 L kettle as an initiator, 10 g of catalyst potassium hydroxide was added, and nitrogen gas replacement was carried out.

14 g of methallyl glycidyl ether and 13.7 g of glycidyl acrylate were added and reacted for 10 hours with the temperature raised to 150° C. and the pressure raised to 0.5 MPa. After the reaction pressure was no longer changed, the reaction product was cured for 5 hours to obtain a crude product of polyether. Phosphoric acid as a neutralizing agent, water, magnesium silicate as an adsorbent and diatomite as a filter aid, which were 1%, 10%, 8%, and 1% of the total mass of the crude polyether, respectively, were added to the crude product of polyether and then filtered to obtain a refined second polyether polyol.

Through a determination, the water content and the acid number of the product were qualified; the hydroxyl number of the above-mentioned product was 11.2 mgKOH/g (theoretical hydroxyl number would be 11.22 mgKOH/g), which proves that the molecular weight of the product had reached the calculated molecular weight of 10000; the determined degree of unsaturation was 0.022 mmol/g (theoretical degree of unsaturation would be 0.235 mmol/g).

The formulation of the polyurethane flexible foam was as follows:
Second polyether polyol: 100 parts
Water: 3.3 parts
Physical foaming agent: 10 parts
Silicone oil: 0.5 parts
Crosslinking agent: 1 part
Foaming catalyst: 0.01 parts
Gel catalyst: 0.02 parts
Antioxidant: 0.3 parts
Anti-yellowing agent: 0.2 parts
Isocyanate (TDI): 47 parts
Isocyanate index: 100

A foam having a density of 40 kg/m$^3$, a white appearance and good air permeability was prepared. The degree of unsaturation of the product was determined to be 0.15 mmol/g.

100 g of the foam was cut into small pieces of 1 cm$^3$ and dispersed after adding chloroplatinic acid (0.09 mol) and 68.5 g of a mixed solvent containing 25% xylenen and 75% methanol, and then 369 g of potassium bicarbonate was added. The above materials reacted for 30 hours at 80° C. After the reaction, the foam was washed with 205 g of the above-mentioned solvent and dried for 20 hours at 120° C. to prepare the final supported metal platinum catalyst. The specific surface area of the catalyst was 2100 m$^2$/g.

Example 3

0.38 g of ethylene glycol monomethyl ether, 0.45 g of 1,2-propylene glycol monomethyl ether, 2.4 g of diethylene glycol monomethyl ether, 0.62 g of ethylene glycol, 3.04 g of 1,2-propylene glycol/1,3-propylene glycol, 1.04 g of neopentyl glycol and 1.64 g of sorbitan were added to a 10 L kettle as an initiator, 2.5 g of catalyst sodium methoxide was added, and nitrogen gas replacement was carried out.

250 g of methallyl glycidyl ether and 750 g of glycidyl acrylate were added and reacted for 5 hours with the temperature raised to 125° C. and the pressure raised to 0.3

MPa. 80 g of propylene oxide was then added and reacted for a total of 5 hours until the reaction pressure was no longer changed. The reaction product was cured for 2.5 hours to obtain a crude product of polyether. Phosphoric acid as a neutralizing agent, water, magnesium silicate as an adsorbent and diatomite as a filter aid, which were 0.5%, 5%, 4%, and 0.5% of the total mass of the crude polyether, respectively, were added to the crude product of polyether and then filtered to obtain a refined second polyether polyol.

Through a determination, the water content and the acid number of the product were qualified; the hydroxyl number was 21.4 mgKOH/g (theoretical hydroxyl number would be 21.32 mgKOH/g), which proves that the molecular weight of the product had reached the calculated molecular weight of 5000; the determined degree of unsaturation was 0.020 mmol/g (theoretical degree of unsaturation would be 0.235 mmol/g).

The formulation of the polyurethane flexible foam was as follows:
Second polyether polyol: 100 parts
Water: 3.3 parts
Physical foaming agent: 10 parts
Silicone oil: 0.5 parts
Crosslinking agent: 1 part
Foaming catalyst: 0.01 parts
Gel catalyst: 0.02 parts
Antioxidant: 0.3 parts
Anti-yellowing agent: 0.2 parts
Isocyanate (TDI): 47 parts
Isocyanate index: 100

A foam having a density of 40 kg/m$^3$, a white appearance and good air permeability was prepared. The degree of unsaturation of the product was determined to be 0.15 mmol/g.

100 g of the foam was cut into small pieces of 1 cm$^3$ and dispersed after adding chloroplatinic acid (0.045 mol) and 35.52 g of a mixed solvent containing 50% ethanol and 50% isopropanol, and then 92 g of potassium bicarbonate was added. The above materials reacted for 20 hours at 45° C. After the reaction, the foam was washed with 106.56 g of the above-mentioned solvent and dried for 10 hours at 85° C. to prepare the final supported metal platinum catalyst. The specific surface area of the catalyst was 2200 m$^2$/g.

Example 4

1.8 g of water, 0.62 g of ethylene glycol, 3.04 g of 1,2-propylene glycol, 1.04 g of neopentyl glycol, 134 g of trimethylolpropane, 1.82 g of sorbitan, and 3.6 g of glucose were added to a 10 L kettle as an initiator, 2.5 g of catalyst potassium methoxide was added, and nitrogen gas replacement was carried out.

27.5 g of methallyl glycidyl ether and 22.5 g of glycidyl methacrylate were added and reacted for 5 hours with the temperature raised to 125° C. and the pressure raised to 0.3 MPa. 99 g of ethylene oxide was added and reacted for a total of 5 hours until the reaction pressure was no longer changed. The reaction product was cured for 2.5 hours to obtain a crude product of polyether. Phosphoric acid as a neutralizing agent, water, magnesium silicate as an adsorbent and diatomite as a filter aid, which were 1%, 10%, 8%, and 1% of the total mass of the crude polyether, respectively, were added to the crude product of polyether and then filtered to obtain a refined second polyether polyol.

Through a determination, the water content and the acid number of the product were qualified; the hydroxyl number was 21.4 mgKOH/g (theoretical hydroxyl number would be 21.32 mgKOH/g), which proves that the molecular weight of the product had reached the calculated molecular weight of 5000; the determined degree of unsaturation was 0.020 mmol/g.

The formulation of the polyurethane flexible foam was as follows:
Second polyether polyol: 100 parts
Water: 3.3 parts
Physical foaming agent: 10 parts
Silicone oil: 0.5 parts
Crosslinking agent: 1 part
Foaming catalyst: 0.01 parts
Gel catalyst: 0.02 parts
Antioxidant: 0.3 parts
Anti-yellowing agent: 0.2 parts
Isocyanate (TDI): 47 parts
Isocyanate index: 100

A foam having a density of 40 kg/m$^3$, a white appearance and good air permeability was prepared. The degree of unsaturation of the product was determined to be 0.15 mmol/g.

100 g of the foam was cut into small pieces of 1 cm$^3$ and dispersed after adding chloroplatinic acid (0.045 mol) and 35.52 g of a mixed solvent containing 50% ethanol and 50% isopropanol, and then 92 g of sodium carbonate was added. The above materials reacted for 20 hours at 45° C.

After the reaction, the foam was washed with 106.56 g of the above-mentioned solvent and dried for 10 hours at 50° C. to prepare the final supported metal platinum catalyst. The specific surface area of the catalyst was 2300 m$^2$/g.

Example 5

The process conditions of Example 5 were basically the same as those of Example 4 except that propylene oxide was used instead of ethylene oxide and potassium carbonate was used as a reducing agent. The specific surface area of the catalyst was 2100 m$^2$/g.

Preparation of a Reactive Sealant Resin

In the following Examples 6 to 10, when the first polyether polyol was prepared, the average molecular weight of the epoxide added at each stage was X and the molecular weight of the hydroxyl-containing initiator was Y, the molar amount of the epoxide to be added at the i$^{th}$ stage was Z times the molar amount of the small-molecule polyol initiator, which satisfied the following relationship: Z=(Mi−M (i−1))/X, wherein i was an integer between 1 to n, and M0 was Y when i=1.

Example 6

An appropriate amount of 1,2-propanediol was added to a reaction kettle, and zinc hexacyanocobaltate was used as a catalyst, whose amount was 30 ppm (based on the total weight of the reaction system during the reaction, the same below). The reaction temperature was controlled at 120° C. and the reaction pressure was 0.4 MPa. Propylene oxide was added to prepare a first polyether polyol according to a polymerization route of 1,2-propanediol-500 g/mol-2000 g/mol-8000 g/mol. Through GPC analysis, it was determined that the polyether molecular weight was 7950 g/mol, the molecular weight distribution was 1.02 and the viscosity was 2000 cp at 25° C.

The first polyether polyol obtained in the preceding step was used as a raw material and heated to 120° C., then a catalyst metal sodium whose amount was in a molar ratio of 1.2:1 to the hydroxyl equivalent of the polyether polyol was added, and then allyl chloride whose amount was in a molar ratio of 1.4:1 to the hydroxyl equivalent of the polyether polyol was added. The above materials reacted for 12 hours at constant temperature to obtain a crude product of double-bond-terminated modified polyether. Subsequently, acetic acid, n-hexane solvent and water, which were 0.5%, 50% and 30% of the mass of the crude product of modified polyether, respectively, were added, stirred and mixed for 2 hours. Water was separated using a coalescing separator, and then the organic solvent was removed by distillation under reduced pressure using a thin film evaporator to obtain a refined product of modified polyether. After the obtained product was analyzed by NMR and GPC, the double bond termination rate was >99.8%, the viscosity was 2050 cp at 25° C., and the molecular weight distribution was 1.073.

The modified polyether obtained in the preceding step was used as a raw material and heated to 60° C., the supported metal platinum catalyst of Example 1 was added, whose amount was 30 ppm (by platinum content, based on the total mass of the reaction system during the reaction, the same below), and then methyldimethoxysilane whose amount was in a molar ratio of 1:1 to the double bond equivalent of the modified polyether was continuously added. The above material reacted at constant temperature for 3 hours to obtain a final product, that is, a reactive sealant resin. After the obtained product was analyzed by NMR and GPC, the silane termination rate was >99.5%, the viscosity was 2100 cp at 25° C., and the molecular weight distribution was 1.073.

Example 7

An appropriate amount of 1,2-propanediol was added to a reaction kettle, and zinc hexacyanocobaltate was used as a catalyst, whose amount was 30 ppm. The reaction temperature was controlled at 160° C. and the reaction pressure was 0.2 MPa. Propylene oxide and ethylene oxide were added, wherein the amount of ethylene oxide was 10% of the total mass of the epoxides, to prepare a first polyether polyol according to a polymerization route of 1,3-propanediol-500 g/mol-2000 g/mol-8000 g/mol-12000 g/mol-18000 g/mol. Through GPC analysis, it was determined that the polyether molecular weight was 17,800 g/mol, the molecular weight distribution was 1.105 and the viscosity was 16000 cp at 25° C.

The first polyether polyol obtained in the preceding step was used as a raw material and heated to 100° C., then a catalyst sodium hydride whose amount was in a molar ratio of 2:1 to the hydroxyl equivalent of the polyether polyol was added, and then methallyl chloride whose amount was in a molar ratio of 1.8:1 to the hydroxyl equivalent of the polyether polyol was added. The above materials reacted for 6 hours at the constant temperature to obtain a crude product of double-bond-terminated modified polyether. Subsequently, acetic acid, n-hexane solvent and water, which were 1%, 100% and 50% of the mass of the crude product of modified polyether, respectively, were added, stirred and mixed for 2 hours. Water and the organic solvent were separated with reference to Example 6 to obtain a refined product of modified polyether. After the obtained product was analyzed by NMR and GPC, the double bond termination rate was >99.5%, the viscosity was 16200 cp at 25° C., and the molecular weight distribution was 1.106.

The modified polyether obtained in the preceding step was used as a raw material and heated to 80° C., the supported metal platinum catalyst of Example 7 was added, whose amount was 15 ppm, and then trimethoxysilane whose amount was in a molar ratio of 1.2:1 to the double bond equivalent of the modified polyether was continuously added. The above material reacted at constant temperature for 2 hours to obtain a final product, that is, a reactive sealant resin. After the obtained product was analyzed by NMR and GPC, the silane termination rate was >99.2%, the viscosity was 16500 cp at 25° C., and the molecular weight distribution was 1.110.

Example 8

An appropriate amount of glycerin was added to a reaction kettle, and zinc hexacyanocobaltate was used as a catalyst, whose amount was 50 ppm. The reaction temperature was controlled at 110° C. and the reaction pressure was 0.3 MPa. Propylene oxide was added to prepare a first polyether polyol according to a polymerization route of trifunctional alcohol-800 g/mol-3000 g/mol-12000 g/mol-18000 g/mol. Through GPC analysis, it was determined that the polyether molecular weight was 17900 g/mol, the molecular weight distribution was 1.090 and the viscosity was 6000 cp at 25° C.

The first polyether polyol obtained in the preceding step was used as the raw material and heated to 140° C., then a catalyst sodium methoxide whose amount was in a molar ratio of 2.4:1 to the hydroxyl equivalent of the polyether polyol was added, and then methallyl chloride whose amount was in a molar ratio of 2:1 to the hydroxyl equivalent of the polyether polyol was added. The above materials reacted for 10 hours at the constant temperature to obtain a crude product of double-bond-terminated modified polyether. Subsequently, acetic acid, n-hexane solvent and water, which were 3%, 150% and 50% of the mass of the crude product of modified polyether, respectively, were added, stirred and mixed for 2 hours. Water and the organic solvent were separated with reference to Example 6 to obtain a refined product of modified polyether. After the obtained product was analyzed by NMR and GPC, the double bond termination rate was >99.2%, the viscosity was 6000 cp at 25° C., and the molecular weight distribution was 1.091.

The modified polyether obtained in the preceding step was used as a raw material and heated to 120° C., the supported metal platinum catalyst of Example 3 was added, whose amount was 5 ppm, and then trimethoxysilane whose amount was in a molar ratio of 1.3:1 to the double bond equivalent of the modified polyether was continuously added. The above material reacted at constant temperature for 4 hours to obtain a final product, that is, a reactive sealant resin. After the obtained product was analyzed by NMR and GPC, the silane termination rate was >99%, the viscosity was 6100 cp at 25° C., and the molecular weight distribution was 1.093.

Example 9

An appropriate amount of sorbitan was added to a reaction kettle, and zinc hexacyanocobaltate was used as a catalyst, whose amount was 30 ppm. The reaction temperature was controlled at 140° C. and the reaction pressure was 0.3 MPa. Propylene oxide was added to prepare a first polyether polyol according to a polymerization route of sorbitan-800 g/mol-4000 g/mol-8000 g/mol-12000 g/mol-18000 g/mol-24000 g/mol-30000 g/mol-40000 g/mol. Through GPC analysis, it was determined that the polyether molecular weight was 38000 g/mol, the molecular weight distribution was 1.152 and the viscosity was 9000 cp at 25° C.

The first polyether polyol obtained in the preceding step was used as a raw material and heated to 120° C., then a catalyst metal sodium and sodium methoxide, whose amounts were in a molar ratio of 0.8:0.8:1 to the hydroxyl equivalent of the polyether polyol was added, and then methallyl chloride whose amount was in a molar ratio of 1.6:1 to the hydroxyl equivalent of the polyether polyol was added. The above materials reacted for 10 hours at the constant temperature to obtain a crude product of double-bond-terminated modified polyether. Subsequently, acetic acid, n-hexane solvent and water, which were 2%, 80% and 60% of the mass of the crude product of modified polyether, respectively, were added, stirred and mixed for 2 hours. Water and the organic solvent were separated with reference to Example 6 to obtain a refined product of modified polyether. After the obtained product was analyzed by NMR and GPC, the double bond termination rate was >99.5%, the viscosity was 9200 cp at 25° C., and the molecular weight distribution was 1.159.

The modified polyether obtained in the preceding step was used as a raw material and heated to 100° C., the supported metal platinum catalyst of Example 4 was added, whose amount was 1 ppm, and then a fixed amount of hydrogen-containing silane whose amount was in a molar ratio of 1:1 to the double bond equivalent of the modified polyether was continuously added. The above material reacted at constant temperature for 2 hours to obtain a final product, that is, a reactive sealant resin. After the obtained product was analyzed by NMR and GPC, the silane termination rate was >99.1%, the viscosity was 9200 cp at 25° C., and the molecular weight distribution was 1.160.

Example 10

An appropriate amount of glycerin was added to a reaction kettle, and zinc hexacyanocobaltate was used as a catalyst, whose amount was 30 ppm. The reaction temperature was controlled at 120° C. and the reaction pressure was 0.4 MPa. A fixed amount of propylene oxide was added to prepare a first polyether polyol according to a polymerization route of trifunctional alcohol-800 g/mol-3000 g/mol-12000 g/mol-18000 g/mol-24000 g/mol. Through GPC analysis, it was determined that the polyether molecular weight was 24200 g/mol, the molecular weight distribution was 1.125 and the viscosity was 10000 cp at 25° C.

The first polyether polyol obtained in the preceding step was used as a raw material and heated to 120° C., then a catalyst sodium methoxide whose amount was in a molar ratio of 1.8:1 to the hydroxyl equivalent of the polyether polyol was added, and then allyl chloride whose amount was in a molar ratio of 1.8:1 to the hydroxyl equivalent of the polyether polyol was added. The above materials reacted for 12 hours at constant temperature to obtain a crude product of double-bond-terminated modified polyether. Subsequently, acetic acid, n-hexane solvent and water, which were 1.5%, 120% and 60% of the mass of the crude product of modified polyether, respectively, were added, stirred and mixed for 2 hours. Water and the organic solvent were separated with reference to Example 6 to obtain a refined product of modified polyether. After the obtained product was analyzed by NMR and GPC, the double bond termination rate was >99.4%, the viscosity was 10100 cp at 25° C., and the molecular weight distribution was 1.126.

The modified polyether obtained in the preceding step was used as a raw material and heated to 100° C., the supported metal platinum catalyst of Example 5 was added, whose amount was 8 ppm, and then methyldimethoxysilane whose amount was in a molar ratio of 1.1:1 to the double bond equivalent of the modified polyether was continuously added. The above material reacted at constant temperature for 6 hours to obtain a final product, that is, a reactive sealant resin. After the obtained product was analyzed by NMR and GPC, the silane termination rate was >99.2%, the viscosity was 10500 cp at 25° C., and the molecular weight distribution was 1.126.

Comparative Example 1

An appropriate amount of polyether polyol whose molecular weight was 1000 and used 1.5 mol of glycerin as an initiator was added to a reaction kettle, and zinc hexacyanocobaltate was used as a catalyst, whose amount was 30 ppm. The reaction temperature was controlled at 120° C. and the reaction pressure was 0.4 MPa. A fixed amount of propylene oxide (based on the target molecular weight 24000 of the polyether polyol) was added to directly prepare a polyether polyol.

The polyether polyol was modified and refined by the same method as the method for preparing the modified polyether in Example 10 to obtain a double-bond-terminated modified polyether polyol. Through GPC analysis, it was determined that the polyether polyol was 24800 g/mol and the molecular weight distribution was 1.20.

1 mol of the above-mentioned modified polyether polyol was taken and heated to 100° C., 3 mol of methyldimethoxysilane was added and reacted under the action of a catalyst chloroplatinic acid (whose content in the reaction system was 8 ppm based on Pt). After the reaction was carried out at constant temperature for 6 hours, a silane-terminated polyalkoxy compound was generated. Through GPC analysis, it was determined that the molecular weight of the product was 25100 g/mol, the molecular weight distribution was 1.20, and the viscosity of the product was 15600 cp at 25° C.

What is claimed is:
1. A method for preparing a reactive sealant resin, comprising:
(1) preparation of a polyether polyol: under the action of an alkali catalyst, polymerizing a hydroxyl-containing initiator with an epoxide to obtain a first polyether polyol;
(2) polyether modification: adding an alkoxidation reagent and a halogenated end-capping agent containing a double bond to the first polyether polyol obtained in step (1) for reaction to obtain a crude product of double-bond-terminated polyether, and refining the obtained crude product to obtain a product of modified polyether;
(3) silane end-capping: subjecting the modified polyether obtained in step (2) as a raw material and hydrogen-containing silane to a silane end-capping reaction under the action of a hydrosilylation catalyst to obtain a target product of a reactive sealant resin;
wherein in step (2), when the crude product is refined, the crude product is first neutralized by using a neutralizing agent, then water and an organic solvent are added, and the water in the crude product is separated by using a coalescing separator, the organic solvent is evaporated, so as to obtain the product of modified polyether;

wherein in step (3), the hydrosilylation catalyst is a supported metal platinum catalyst with an amount of 0.1 ppm to 50 ppm, based on the platinum content; and wherein the supported metal platinum catalyst is obtained by subjecting a chloroplatinic acid solution to impregnation and reduction with a polyurethane flexible foam as a carrier; the polyurethane flexible foam is prepared by subjecting a raw material comprising a second polyether polyol to a foaming reaction, wherein a polymerized monomer for preparing the second polyether polyol comprises an epoxide containing a C=C double bond in the molecule, and the content of the epoxide in the polymerized monomer is 1 wt % to 40 wt %.

2. The preparation method according to claim 1, wherein in step (1), the first polyether polyol has a molecular weight of 3000 g/mol to 50000 g/mol and a functionality of 2 to 8.

3. The preparation method according to claim 1, wherein in step (1), the first polyether polyol is obtained by a n-stage polymerization, wherein n≥2; when the target molecular weights of each polymerization stage are sequentially set to M1, . . . , Mi, . . . , and Mn, M1≤1000 g/mol, and Mi−M(i−1)≤12000 g/mol, wherein i is an integer between 1 and n, and when i=1, M0 is the molecular weight of the hydroxyl-containing initiator.

4. The preparation method according to claim 3, wherein when Mi≤10000 g/mol, Mi−M(i−1)≤5000 g/mol.

5. The preparation method according to claim 1, wherein in step (1), the epoxide is ethylene oxide, propylene oxide or a mixture of any proportion thereof.

6. The preparation method according to claim 1, wherein in step (1), the hydroxyl-containing initiator is a small-molecule polyol having a molecular weight of not greater than 400.

7. The preparation method according to claim 6, wherein in step (1), the hydroxyl-containing initiator is one or more of ethylene glycol, 1,2-propylene glycol, 1,3-propylene glycol, glycerol, trimethylolpropane, pentaerythritol, sorbitol, mannitol, glucose, sucrose or xylitol.

8. The preparation method according to claim 1, wherein the content of the alkali catalyst in the reaction system of step (1) is 10 ppm to 100 ppm; the alkali catalyst is one or more of an alkali metal, an alkali metal hydride, an alkali metal hydroxide, an alkali metal alkoxide, a composite metal cyanide or a phosphazene catalyst.

9. The preparation method according to claim 1, wherein in step (1), the reaction temperature for preparing the first polyether polyol is 90° C. to 180° C.; the reaction pressure is 0.05 MPa to 0.8 MPa.

10. The preparation method according to claim 1, wherein the alkoxidation reagent in step (2) is one or more of an alkali metal sodium, a sodium hydride or a sodium methoxide; a halide containing a double bond used is allyl chloride or methallyl chloride.

11. The preparation method according to claim 1, wherein in step (2), the molar ratio of the amount of the alkoxidation reagent to the hydroxyl equivalent of the polyether polyol is 1:1 to 3:1; the molar ratio of the amount of the halide containing a double bond to the hydroxyl equivalent of the polyether polyol is 1:1 to 3:1.

12. The preparation method according to claim 1, wherein in step (2), the reaction temperature for modifying the polyether polyol to prepare the double-bond-terminated polyether is 80° C. to 160° C.; the reaction time is 3 hours to 18 hours.

13. The preparation method according to claim 1, wherein the mass ratio of the organic solvent, water and polyether crude product is (0.1 to 3): (0.1 to 2): 1.

14. The preparation method according to claim 1, wherein the neutralizing agent is one or more of hydrochloric acid, sulfuric acid, phosphoric acid, acetic acid or lactic acid, and the amount of the neutralizing agent is 0.1 wt % to 5 wt % of the mass of the polyether crude product;

the organic solvent is an alkane, a benzene compound or a nitrile compound.

15. The preparation method according to claim 1, wherein in step (3), the hydrogen-containing silane is one selected from the group consisting of trimethoxysilane, triethoxysilane, methyldimethoxysilane, methyldiethoxysilane, and a mixture of more than one selected therefrom.

16. The preparation method according to claim 15, wherein the molar ratio of the amount of the hydrogen-containing silane to the double bond equivalent of the modified polyether is 0.9:1 to 2:1; the reaction temperature is 50° C. to 140° C.; the reaction time is 1 hour to 8 hours.

17. The preparation method according to claim 1, wherein the epoxide containing a C=C double bond is one or more of allyl glycidyl ether

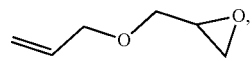

methallyl glycidyl ether, glycidyl acrylate or glycidyl methacrylate

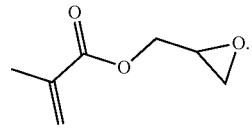

18. The preparation method according to claim 1, wherein the second polyether polyol is obtained by polymerizing the hydroxyl-containing initiator with the polymerized monomer comprising the epoxide containing a C=C double bond in the molecule under the action of an alkali catalyst; the second polyether polyol has a molecular weight of 700 g/mol to 10000 g/mol and a nominal functionality of 1 to 6.

19. The preparation method according to claim 1, wherein the polymerized monomer consists of at least one of ethylene oxide or propylene oxide and the epoxide containing a C=C double bond in the molecule.

20. The preparation method according to claim 19, wherein the epoxide containing a C=C double bond in the molecule is first added during the addition of the polymerized monomer.

21. The preparation method of claim 1, wherein during the impregnation, the polyurethane flexible foam is added to the chloroplatinic acid solution, the impregnation is carried out at a reaction temperature of 10° C. to 80° C., then a reducing agent is added and reacted for 10 hours to 30 hours, and after the reaction, the polyurethane flexible foam is taken out, washed and dried to obtain the supported metal platinum catalyst.

22. The preparation method according to claim 1, wherein the amount of substance of chloroplatinic acid in the impregnation solution is 0.01*n to 0.6*n, wherein n is the amount of substance of double bonds contained in the added polyurethane flexible foam, calculated in terms of unsaturation.

* * * * *